United States Patent [19]

Huber et al.

[11] Patent Number: 4,477,371

[45] Date of Patent: Oct. 16, 1984

[54] AQUEOUS DISPERSIBLE DEFOAMERS

[75] Inventors: Peter Huber; Franz Wimmer; Ernst Innertsberger, all of Burghausen; Jakob Schmidlkofer, Mehring-Öd, all of Fed. Rep. of Germany

[73] Assignee: Wacker-Chemie GmbH, Munich, Fed. Rep. of Germany

[21] Appl. No.: 518,787

[22] Filed: Jul. 29, 1983

[30] Foreign Application Priority Data

Sep. 23, 1982 [DE] Fed. Rep. of Germany ....... 3235256

[51] Int. Cl.$^3$ .................... B01D 19/04; C09K 3/00
[52] U.S. Cl. .................................. 252/358; 252/321; 560/199
[58] Field of Search ................. 252/358, 321; 560/199

[56] References Cited

U.S. PATENT DOCUMENTS 4,076,648 2/1978 Rosen ................................. 252/358
4,316,987 2/1982 Ceprini et al. ..................... 560/199
4,384,976 5/1983 Grünert et al. ..................... 252/358

Primary Examiner—Richard D. Lovering
Assistant Examiner—Anne Brookes

[57] ABSTRACT

Aqueous dispersible defoamers containing an organopolysiloxane, filler, a dispersant which is at least in part a surfactant and 2,2,4-trimethyl-1,3 diisobutyloxypentane, in which at least a portion of the organopolysiloxane contains in addition to the SiC-bonded organic radicals, SiOC-bonded radicals having at least 6 carbon atoms per radical which contain carbon and hydrogen atoms and/or carbon, hydrogen and at least 2 oxygen atoms per radical and may also contain at least one silicon atom.

2 Claims, No Drawings

AQUEOUS DISPERSIBLE DEFOAMERS

The present invention relates to defoamers which are readily dispersible in water and more particularly to aqueous dispersible defoamers which are very effective in retarding or controlling foam formation.

BACKGROUND OF THE INVENTION

Aqueous dispersible defoamers containing an organopolysiloxane, filler and dispersant are known in the art. For example, U.S. patent application Ser. No. 114,874 to Pirson et al, describes self-emulsifiable antifoams containing an organopolysiloxane, filler, a water-soluble cellulose derivative and a dispersant having the formula $$R\ COO(CH_2)_2\ SO_3\ M,$$

where R is an aliphatic hydrocarbon radical having at least 7 carbon atoms in which at least 10 percent of the number of R radicals have at least 11 carbon atoms and M is an ammonium radical or an alkali metal atom.

In contrast to the defoamers known heretofore, the aqueous defoamers of the present invention are more readily dispersible in water.

Therefore, it is an object of this invention to provide aqueous dispersible defoamers. Another object of this invention is to provide defoamers which are readily dispersible in water. A further object of this invention is to provide aqueous dispersible defoamers which have improved stability.

SUMMARY OF THE INVENTION

The foregoing objects and others which will become apparent from the foregoing description are accomplished in accordance with this invention, generally speaking by providing aqueous dispersible defoamers containing an organopolysiloxane, filler, a dispersant which is at least in part a surfactant and 2,2,4-trimethyl-1,3-diisobutyryloxypentane, in which the organopolysiloxane contains SiC-bonded organic radicals and SiOC-bonded radicals having at least 6 carbon atoms per radical which contain carbon and hydrogen atoms and/or carbon, hydrogen and at least 2 oxygen atoms per radical and may also contain at least one silicon atom.

DESCRIPTION OF THE INVENTION

The organopolysiloxane present in the defoamer of the present invention is preferably composed of units having the formulas $R_2SiO$ and $R_2(R'O)SiO_{\frac{1}{2}}$ and, if desired, at least one of the units selected from the formulas $R_3SiO_{\frac{1}{2}}$, $RSiO_{3/2}$, $R(R'O)SiO$, $SiO_{4/2}$ and $R'OSiO_{3/2}$ in which R represents the same or different monovalent hydrocarbon radicals or substituted monovalent hydrocarbon radicals which preferably have from 1 to 18 carbon atoms per radical; R' represents SiOC-bonded radicals having at least 6 carbon atoms per radical which are composed of carbon and hydrogen atoms and/or carbon, hydrogen and at least 2 oxygen atoms per radical and may also contain at least one silicon atom.

Examples of hydrocarbon radicals represented by R are alkyl radicals such as methyl, ethyl, n-propyl, isopropyl, n-butyl, and sec-butyl radicals as well as octadecyl radicals; alkenyl radicals such as the vinyl radical; cycloalkyl radicals such as the cyclohexyl radical and methylcyclohexyl radical; aryl radicals such as the phenyl radical; aralkyl radicals such as the 2-phenylpropyl radical; and alkaryl radicals such as the tolyl radicals.

Examples of substituted hydrocarbon radicals represented by R are halogenated hydrocarbon radicals such as the 3,3,3-trifluoropropyl radical and o-, p-, and m-chlorophenyl radicals.

Preferably, at least 80 percent of the number of SiC-bonded radicals in the organopolysiloxane of the defoamer are methyl radicals.

The SiOC-bonded radicals having at least 6 carbon atoms per radical which are composed of carbon and hydrogen atoms and/or carbon, hydrogen and at least 2 oxygen atoms per radical and may also contain at least one silicon atom are preferably monovalent radicals; however, they can also be divalent radicals.

The SiOC-bonded radicals preferably have at least 6 carbon atoms per radical and more preferably from 6 to 30 carbon atoms per radical. Furthermore, it is preferred that these radicals be alkyl radicals such as n-hexyl, 2-ethylhexyl, lauryl, isotridecyl, and 2-octyldodecyl radicals or cycloalkyl radicals such as methycyclohexyl radicals. However, these radicals can also be radicals which, for example, are composed of carbon and hydrogen atoms and have an aliphatic multiple bond, such as the oleyl radical; aryl radicals such as the phenyl radical; aralkyl radicals such as the benzyl radical; or alkaryl radicals such as the tolyl radicals.

When the SiOC-bonded radicals, have at least 6 carbon atoms per radical and consist of carbon, hydrogen and at least 2 oxygen atoms per radical, then at least 2 of the oxygen atoms are preferably ether oxygen atoms. Furthermore, it is preferred that these radicals have a molecular weight of from 100 to 200,000.

Suitable examples of SiOC-bonded radicals, which may or may not contain at least one silicon atom and have at least 6 carbon atoms per radical containing carbon, hydrogen and at least 2 oxygen atoms per radical, are polyethylene glycols, polypropylene glycols, and copolymers of ethylene oxide and propylene oxide units, where the different units can be present in blocks or randomly distributed. Although it is not preferred, when these radicals are monovalent then the oxygen atom positioned at the opposite end of the molecule from the oxygen atom bonded to the silicon atom is preferably bonded to an alkyl radical such as a methyl or n- or tert-butyl radical. However, it can also be bonded, for example, to an acyl radical such as the acetyl radical or, for example, to a trimethylsilyl radical.

The organopolysiloxane, which contains in addition to the SiC-bonded organic radicals, SiOC-bonded radicals having at least 6 carbon atoms per radical, which may be the same or different and are composed of carbon and hydrogen atoms and/or carbon, hydrogen and at least 2 oxygen atoms per radical and may also contain at least one silicon atom, can be prepared, for example, by the condensation of organopolysiloxanes having Si-bonded hydroxyl groups with alcohols of the general formula $$R'OH,$$

where R' is the same as above, in the presence of acidic or alkaline catalysts such as acid-treated bentonite or methanolic potassium hydroxide.

One type of organopolysiloxane containing SiOC-bonded organic radicals such as described above, can be used in the preparation of the defoamers of the invention. Likewise, the defoamers of this invention can also contain at least two different types of organopolysiloxanes having SiOC-bonded radicals.

Preferably, at least 90 percent of the number of units in the organopolysiloxane containing SiOC-bonded radicals of the type described above have the formulas $R_2SiO$ and $R_2(R'O)SiO_{\frac{1}{2}}$, where R and R' are the same as above. Furthermore, it is preferred that such an organopolysiloxane have an average viscosity of from 5 to 5,000 $mm^2 \cdot s^{-1}$.

The organopolysiloxane, which contains SiC-bonded organic radicals and SiOC-bonded radicals having at least 6 carbon atoms per radical which are composed of carbon and hydrogen atoms and/or carbon, hydrogen and at least 2 oxygen atoms per radical and may also contain at least one silicon atom, is preferably present in the defoamer composition in an amount of from 5 to 70 weight percent, based on the total weight of the defoamer composition consisting of the organopolysiloxane, filler, dispersant, and 2,2,4-trimethyl-1,3-diisobutyryloxypentane.

The proportion of the dispersant is preferably from 5 to 50 weight percent based on the total weight of the defoamer composition containing the organopolysiloxane, filler, dispersant, and 2,2,4-trimethyl-1,3-diisobutyryloxypentane. Obviously, the weight percentages of organopolysiloxane, filler, dispersant, and 2,2,4-trimethyl-1,3-diisobutyryloxypentane present in the defoamer composition must add up to 100 weight percent.

Examples of preferred dispersants are ethylene oxide adducts of linear or branched alkanols or arylphenols having from 8 to 20 carbon atoms per molecule, such as isotridecyl polyoxyethylene glycol ether, stearyl polyoxyethylene glycol ether, cetyl polyoxyethylene glycol ether, trimethylnonyl polyoxyethylene glycol ether, and nonylphenol polyoxyethylene glycol ether, and also ethylene oxide adducts of linear or branched monocarboxylic acids. Preferably, such addition products contain from 2 to 15 ethylene oxide units per molecule. Other examples of preferred dispersants are polyoxyethylene glycol sorbitan esters or polyoxyethylene glycol sorbitol esters having HLB values of from 8 to 14, such as polyoxyethylene glycol sorbitan hexaoleate or polyoxyethylene sorbitol hexaoleate. (U.S. Pat. No. 4,076,648 to Rosen). Additional examples of preferred dispersants are fatty acid mono-, di-, and polyglycerides and sodium or calcium stearoyl lactate, diglycerol stearate, and sorbitan monostearate.

The defoamer of the present invention can contain a single type of dispersant or it can contain mixtures of at least two different types of dispersants.

Another component of the defoamers of this invention is 2,2,4-trimethyl-1,3-diisobutyryloxypentane, also described as 2,2,4-trimethyl-1,3-pentanediol diisobutyrate, which has the following formula:

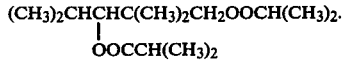

The proportion of 2,2,4-trimethyl-1,3-diisobutyryloxypentane is preferably from 10 to 90 percent based on the total weight of the defoamer composition containing organopolysiloxane, filler, dispersant, and 2,2,4-trimethyl-1,3-diisobutyryloxypentane.

The fillers in the defoamers of the present invention can be the same fillers which have been or could have been employed in defoamers known heretofore. Examples of such fillers are hydrophilic and hydrophobic oxides of silicon, magnesium, or zinc, where these oxides preferably have a surface area of at least 50 $m^2/g$, salts of elements from Groups II or III of Mendeleev's Periodic Table having an atomic number of from 12 to 30 and aliphatic monobasic carboxylic acids or hydroxycarboxylic acids having from 12 to 22 carbon atoms per molecule, such as calcium stearate or calcium 12-hydroxystearate. Other fillers which may be employed in the defoamers are products which are solid at least at the application temperature of the defoamer and have been obtained from the reaction of at least one monovalent or multivalent isocyanate with at least one organic compound containing at least one hydrogen atom which is reactive with the isocyanate group, such as, for example, the product obtained from the reaction of naphthalene diisocyanate with cyclohexylamine. Preferably, these fillers are prepared in the presence of at least one of the organopolysiloxanes used to produce the defoamer of the present invention. Other examples of fillers which may be used in the defoamers of this invention are lithium stearate, magnesium silicate, and magnesium aluminum silicate. The preferred fillers are pyrogenically produced or precipitated silicas having a surface area of at least 50 $m^2/g$.

The defoamers of the invention may contain only one type of filler or they may contain mixtures of at least two different types of fillers.

The proportion of filler is preferably from 2 to 8 weight percent, based on the total weight of the defoamer composition consisting of organopolysiloxane, filler, dispersant, and 2,2,4-trimethyl-1,3-diisobutyryloxypentane.

In addition to the organopolysiloxane which contains SiC-bonded organic radicals and the SiOC-bonded organic radicals described above, the defoamer of this invention can contain other organopolysiloxanes. Examples of such other organopolysiloxanes are trimethylsiloxy end-blocked dimethylpolysiloxanes or trimethylsiloxy end-blocked copolymers containing dimethylsiloxane and diphenylsiloxane and/or methylphenylsiloxane units and having a viscosity of from 35 to 100,000 $mm^2 \cdot s^{-1}$ at 25° C., preferably from about 50 to 50,000 $mm^2 \cdot s^{-1}$ at 25° C. Examples of such additional organopolysiloxanes are organopolysiloxane resins which are solid at room temperature, and are composed of $(CH_3)_3SiO_{178}$ and $SiO_{4/2}$ units with from 0.25 to 1.25 $(CH_3)_3SiO_{\frac{1}{2}}$ units per $SiO_{4/2}$. These organopolysiloxane resins are generally dissolved in an organic solvent to form a solution and then mixed with the organopolysiloxane containing SiC-bonded organic radicals and SiOC-bonded organic radicals of the type described above. The solvent is then distilled off from the mixture thus obtained. Examples of other organopolysiloxanes, are organopolysiloxane resins which have a viscosity of from 100,000 to 500,000 $mm^2 \cdot s^{-1}$ at 25° C. and are composed of $CH_3SiO_{3/2}$ and $(CH_3)_2SiO$ units, with from 0.8 to 2 $CH_3SiO_{3/2}$ units per $(CH_3)_2SiO$ unit. Examples of other organopolysiloxanes which may be present, the organopolysiloxanes composed of, for example, $CH_3SiO_{3/2}$, $(CH_3)_3SiO_{\frac{1}{2}}$, and $(CH_3)_2SiO$ units, in which these units are preferably present in a molar ratio of 0.5:0.45:0.05, respectively, and contain at least 2 weight percent, based on their weight of Si-bonded hydroxyl groups and have a viscosity of from 30 to 2,000 $mm^2 \cdot s^{-1}$, and more preferably from 80 to 200 $mm^2 \cdot s^{-1}$ at 25° C. Such low-viscosity organopolysiloxanes containing a relatively large number of Si-bonded hydroxyl groups are particularly preferred when the proportion of organopolysiloxane containing the SiC-bonded radicals and SiOC-bonded radicals of the type described above, is kept to a minimum.

When the defoamer of the present invention contains organopolysiloxanes in addition to the organopolysiloxane having SiC-bonded organic radicals and SiOC-bonded organic radicals of the type described above, then it is preferred that the proportion of such additional organopolysiloxanes be in the range of from 5 to 95 weight percent based on the total weight of all the organopolysiloxanes present in the defoamer.

The defoamers of this invention may contain in addition to the organopolysiloxane, filler, dispersant, and 2,2,4-trimethyl-1,3-diisobutyryloxypentane, other substances which have been or could have been employed in defoamers based on a defoaming organopolysiloxane and filler. Examples of such additional substances are mineral oils, vegetable oils, higher alcohols, glycols, and ethylene oxide-propylene oxide block copolymers.

In preparing the defoamers of the present invention the organopolysiloxane and filler are preferably mixed together and then the remaining components are added to the mixture thus obtained.

The term "aqueous dispersible defoamers" as used herein, refers to defoamers consisting of essentially nonaqueous mixtures, which prior to use may be mixed with water to form aqueous emulsions. These aqueous emulsions are used to retard or prevent foam formation.

The defoamers of this invention are not used exclusively as aqueous solutions. For example, they may be added to detergents or one or more components of the detergent such as sodium polyphosphate or sodium perborate or a mixture of such sodium compounds. Furthermore, they may be used, for example, in the evaporation of alkaline black liquors in the paper industry, in the concentration of rubber latexes, in cutting oil emulsions in the metal working industry, in dispersed dyes, in synthetic resin dispersions, in water-based paints, in lubricants, in petroleum recovery, textile dyeing, including the high-temperature dyeing process and jet dyeing, wastewater treatment, fermentation processes, such as the production of antibiotics, and ore flotation.

In the following examples, the effectiveness of the defoamer is represented by an "FRA" number. (FRA is an abbreviation for "foam resistance area") and is determined in the following manner:

In an 800 ml beaker having a diameter of 9.5 cm and a height of 13 cm, the defoamer to be investigated is added to 200 ml of a 4 weight percent aqueous solution of sodium $C_{14}$–$C_{15}$-alkylsulfonate. The mixture thus obtained is foamed with 2 oppositely rotating stirrers with multiple arms, each arm in itself closed, at 1000 rpm for 1 minute such that no homogeneous liquid remains. Four light barriers are placed at a distance of 1.5 cm from one another vertically along the outer wall of the beaker. Such a device is described in German patent application No. 25 51 260 (Offenlegungsschrift) to Wacker-Chemie GmbH. As the foam collapses, the light barriers are cleared one after another and a diagram is plotted automatically with a recorder, giving on the abscissa (1 cm=10 seconds) the times which elapse before disappearance of the foam at the uppermost, second highest, third highest, and lowest light barriers. A level of 8 cm on the ordinate corresponds to the uppermost light barrier. A line is obtained which rises 8 cm almost vertically from the intersection of the abscissa and the ordinate and then runs horizontally until the time at which the uppermost light barrier is cleared; at this point the line drops vertically and then again runs horizontally until the time when the second-highest light barrier is cleared; at this time the line drops vertically and so forth. The area bounded by the stepped line thus obtained and the abscissa and ordinate is measured and gives the FRA value. The smaller this value, the greater the effectiveness of the defoamer.

In the following examples, all parts and percentages are by weight unless otherwise specified.

EXAMPLE 1

(a) A mixture containing 750 g of dimethylpolysiloxane having an Si-bonded hydroxyl group in each of its terminal units and having a viscosity of 80 $mm^2 \cdot s^{-1}$ at 25° C. and 250 g of 2-octyldodecanol, is mixed with 5 ml of 20 percent methanolic potassium hydroxide and heated for 4 hours at 140° C. with agitation. After cooling, the potassium hydroxide is neutralized with dimethyldichlorosilane. The volatile components are then distilled off yielding an oil having a viscosity of 6 $mm^2 \cdot s^{-1}$ at 25° C.

(b) The oil thus obtained in (a) above is mixed with 300 g of a 50 percent solution in toluene of an organopolysiloxane resin which is composed of $(CH_3)_3SiO_{\frac{1}{2}}$ and $SiO_{4/2}$ units and which has 0.56 $(CH_3)_3SiO_{\frac{1}{2}}$ units per $SiO_{4/2}$ unit. The solvent is then distilled off at 120° C. under a pressure of from ambient atmospheric pressure to approximately 16 mbar (abs.).

The organopolysiloxane mixture thus obtained has a viscosity of 84 $mm^2 \cdot s^{-1}$ at 25° C.

(c) Using a three-roll mill, 94 parts of the organopolysiloxane mixture prepared in accordance with Example 1(b) above, are mixed with 3 parts of precipitated hydrophilic silica having a surface area of 90 $m^2/g$ and 3 parts of pyrogenically produced hydrophobic silica having a surface area of 150 $m^2/g$.

(d) About 50 parts of the mixture containing the organopolysiloxane and filler prepared in accordance with Example 1(c) above, are mixed into a melt consisting of 6 parts of stearyl polyoxyethylene glycol ether having from 4 to 6 ethylene oxide units per molecule, 9 parts of polyoxyethylene glycol sorbitol hexaoleate (with an HLB value of approximately 11), 17 parts of sodium stearoyl lactate, and 18 parts of 2,2,4-trimethyl-1,3-diisobutyryloxypentane at a temperature of 80° C.

A finely dispersed emulsion, in which the components are uniformally dispersed therein, can be prepared from the mixture with a blade-type stirrer or even with a stirring rod. A 0.4 g quantity of an emulsion containing 15 parts of the mixture prepared in accordance with Example 1(d) above and 85 parts water gives an FRA value of 700. This emulsion has excellent storage stability.

EXAMPLE 2

About 40 parts of a mixture containing 20 percent of the mixture prepared in accordance with Example 1(c) above and 80 percent of a mixture containing 8 parts of hydrophilic silica having a surface area of 150 $m^2/g$ and 92 parts of an organopolysiloxane (composed of 5 mol percent dimethylsiloxane units, 45 mol percent trimethylsiloxane units, and 5 mol percent monomethylsiloxane units and having 2 percent Si-bonded hydroxyl groups and a viscosity of 150 $mm^2 \cdot s^{-1}$ at 25° C.) are added to a mixture containing 30 parts of isotridecyl polyoxyethylene glycol ether having 5 ethylene oxide units per molecule, 15 parts of 2,2,4-trimethyl-1,3-diisobutyryloxypentane, and 15 parts of white oil (a type of mineral oil). A 0.2 g quantity of this mixture gives an FRA value of 800.

When the mixture is poured into water, it immediately forms a homogeneous finely dispersed emulsion. No oily phase separation is observed when an emulsion containing 1 part of the mixture, prepared above and 99 parts water is boiled.

EXAMPLE 3

A mixture containing 80 percent of a trimethylsiloxy end-blocked dimethylpolysiloxane having a viscosity of 100 $mm^2 \cdot s^{-1}$ and 20 percent pyrogenically produced hydrophilic silica having a surface area of 200 $m^2/g$ is heated for 8 hours at 200° C., and then cooled. About 8 parts of this mixture are mixed with 2 parts of a mixture prepared on a three-roll mill containing 94 parts of the organopolysiloxane prepared in accordance with Example 1(a) and having SiOC-bonded alkyl groups and 3 parts of precipitated hydrophilic silica having a surface area of 90 $m^2/g$ and 3 parts of pyrogenically produced hydrophobic silica having a surface area of 150 $m^2g$, 64 parts of 2,2,4-trimethyl-1,3-diisobutyryloxypentane, 20 parts of white oil, and 6 parts of polyoxyethylene glycol sorbitan hexaoleate having an HLB value of approximately 11. A 0.2 g quantity of this mixture gives an FRA value of 500. A homogeneous, finely dispersed emulsion can be readily prepared from the mixture with a blade-type stirrer or with a stirring rod.

EXAMPLE 4

(a) A mixture containing 750 g of a dimethylpolysiloxane having an Si-bonded hydroxyl group in each of its terminal units and a viscosity of 100 $mm^2 \cdot s^{-1}$ at 25° C., 250 g of a polypropylene glycol having a molecular weight of about 2,000, and 30 g of acid-treated bentonite is heated for 5 hours at 150° C. with agitation. The solids are removed and the volatile components are distilled off yielding an oil.

(b) The oil thus obtained is substituted for the organopolysiloxane prepared in Example 1(a) above, having SiOC-bonded alkyl groups in accordance with the procedure described in Example 1(b) above. The organopolysiloxane mixture thus obtained has a viscosity of 150 $mm^2 \cdot s^{-1}$ at 25° C.

(c) About 20 parts of the organopolysiloxane mixture prepared in accordance with Example 4(b) above are mixed on a three-roll mill with 20 parts of a mixture containing 92 percent of a trimethylsiloxy end-blocked dimethylpolysiloxane having a viscosity of 5000 $mm^2 \cdot s^{-1}$ at 25° C., 2 percent calcium stearate, 2 percent calcium 12-hydroxystearate, and 4 percent pyrogenically produced hydrophilic silica having a surface area of 130 $m^2/g$.

(d) After diluting with 20 parts of soybean oil, the mixture containing the organopolysiloxane and filler prepared in accordance with 4(c) above is blended with a mixture consisting of 5 parts of an adduct of ethylene oxide and stearic acid having 4 ethylene oxide units per molecule and 7 parts of sodium stearoyl lactate at 65° C. About 10 parts of polyoxyethylene sorbitol hexaoleate (an HLB value of approximately 11) are blended first with the above mixture, and then, while stirring with 15 parts of a mineral oil having a viscosity of 320 $mm^2 \cdot s^{-1}$ at 20° C., which is free of aliphatic multiple bonds, and 13 parts 2,2,4-trimethyl-1,3-diisobutytyloxypentane. A 0.2 g quantity of the mixture, which can readily be dispersed in water, gives an FRA value of 350.

EXAMPLE 5

(a) A mixture containing 500 g of a dimethylpolysiloxane having an Si-bonded hydroxyl group in each of the terminal units and a viscosity of 80 $mm^2 \cdot s^{-1}$ at 25° C. and 500 g of polypropylene glycol monomethyl ether having a molecular weight of 2,000, is mixed with 5 ml of a 20 percent methanolic potassium hydroxide and then heated at 140° C. for 4 hours with agitation. The oil thus obtained has a viscosity of 170 $mm^2 \cdot s^{-1}$ at 25° C.

(b) About 50 parts of the oil prepared in accordance with Example 5(a) are mixed with 5 parts of pyrogenically produced hydrophobic silica having a surface area of 200 $m^2/g$. This mixture is mixed with a mixture containing 10 parts of the organopolysiloxane described in Example 2, containing a dimethylsiloxane, trimethylsiloxane, and monomethylsiloxane units and 2 parts of lithium stearate.

(c) About 10 parts of isotridecyl polyoxyethylene glycol ether having 5 ethylene oxide units per molecule are blended first with the mixture of organopolysiloxane and filler prepared in accordance with the procedure of Example 5(b) and then with 23 parts of 2,2,4-trimethyl-1,3-diisobutyryloxypentane in a mixing apparatus capable of being operated in a frequency range from sonic to ultrasonic (available under the registered trademark "Ultra-Turrax"). A 0.2 g quantity of the resultant mixture gives an FRA value of approximately 300.

When the mixture is poured into water, it immediately forms a finely dispersed emulsion.

EXAMPLE 6

(a) The procedure of Example 5(a) above is repeated except that 500 g of polypropylene glycol mono-n-butyl ether having a molecular weight of 700 is substituted for the polypropylene glycol monomethyl ether.

(b) The procedure of Example 1(b) above is repeated except that the oil thus obtained in Example 6(a) above, is substituted for the organopolysiloxane prepared in accordance with Example 1(a) above, containing SiOC-bonded alkyl groups. The organopolysiloxane mixture thus obtained has a viscosity of 200 $mm^2 \cdot s^{-1}$ at 25° C.

(c) About 15 parts of the organopolysiloxane mixture prepared in accordance with Example 6(b) above, are first mixed with 5 parts of a trimethylsiloxy end-blocked diorganopolysiloxane containing 90 mol percent dimethylsiloxane units and 10 mol percent diphenylsiloxane units and having a viscosity of 300 $mm^2 \cdot s^{-1}$ at 25° C. and then with 25 parts of 2,2,4-trimethyl-1,3-diisobutytyloxypentane. After diluting with 17 parts of naphthenic mineral oil having a viscosity of 70 $mm^2 \cdot s^{-1}$ at 20° C., 8 parts of a mixture consisting of equal parts by weight of pyrogenically produced hydrophobic silica having a surface area of 180 $m^2/g$ and pyrogenically produced hydrophobic silica having a surface area of 300 $m^2/g$ are blended with this mixture using a mixing apparatus capable of being operated in a frequency range from sonic to ultrasonic. The resultant mixture is blended with a mixture heated to 45° C. consisting of 10 parts of isotridecyl polyoxyethylene glycol ether having 5 ethylene oxide units per molecule and 15 parts of polyoxyethylene sorbitol hexaoleate. About 0.2 g of the mixture, which can be readily dispersed in water, gives an FRA value of approximately 500.

What is claimed is:

1. An aqueous dispersible defoamer composition containing an organopolysiloxane, filler, a dispersant which is at least in part a surfactant and 2,2,4-trimethyl-1,3-diisobutyryloxypentane in an amount of from 10 to 90 percent by weight based on the weight of the organopolysiloxane, filler, dispersant and 2,2,4-trimethyl-1,3-diisobutyryloxypentane, in which the organopolysiloxane contains SiC-bonded organic radicals and SiOC-bonded radicals having at least 6 carbon atoms per radical which are composed of carbon and hydrogen atoms or carbon, hydrogen and at least 2 oxygen atoms per radical.

2. The defoamer composition of claim 1, wherein the SiOC-bonded radicals also contain at least one silicon atom.

* * * * *